United States Patent [19]

Halter et al.

[11] Patent Number: 4,968,441

[45] Date of Patent: Nov. 6, 1990

[54] FIRE CONTROL COMPOSITION

[75] Inventors: Alain Halter, Metz; Joël Hussenet; Paul Arker, both of Montigny les Metz, all of France; François Toussaint, Montignies le Tilleul, Belgium

[73] Assignee: Glaverbel, Brussels, Belgium

[21] Appl. No.: 241,189

[22] Filed: Sep. 7, 1988

[30] Foreign Application Priority Data

Sep. 7, 1987 [GB] United Kingdom ................. 8720996

[51] Int. Cl.[5] ........................ A62D 1/00; C09K 21/00; A62C 13/62; A62C 13/66

[52] U.S. Cl. ........................................... 252/2; 252/4; 252/7; 252/601; 169/46; 169/9; 169/71

[58] Field of Search ........................... 252/2, 7, 4, 601; 169/9, 46, 71

[56] References Cited

U.S. PATENT DOCUMENTS

| | | | |
|---|---|---|---|
| 2,368,209 | 1/1945 | Fahey et al. | 252/2 |
| 2,730,841 | 1/1956 | Searight | 49/79 |
| 3,055,435 | 9/1962 | Warnock et al. | 169/31 |
| 3,090,749 | 5/1963 | Warnock | 252/2 |
| 3,393,155 | 7/1968 | Schutte et al. | 252/2 |
| 3,830,738 | 8/1974 | Cottrell | 252/4 |
| 3,963,626 | 6/1976 | Schmitt | 252/2 |
| 3,963,627 | 6/1976 | Cottrell | 252/4 |
| 4,173,538 | 11/1979 | Herbline | 252/8 |
| 4,183,980 | 1/1980 | Nielsen | 427/215 |
| 4,226,727 | 10/1980 | Tarpley, Jr. et al. | 252/8 |
| 4,255,489 | 3/1981 | Nielsen | 428/405 |
| 4,346,012 | 8/1982 | Umaba | 252/7 |
| 4,713,295 | 12/1987 | Laroche | 428/406 |

FOREIGN PATENT DOCUMENTS

| | | |
|---|---|---|
| 1152808 | 6/1956 | France . |
| 0122576 | 12/1983 | Japan . |
| 573408 | 11/1945 | United Kingdom . |
| 837311 | 6/1960 | United Kingdom . |
| 884946 | 12/1961 | United Kingdom . |
| 960007 | 6/1964 | United Kingdom . |
| 1096420 | 12/1967 | United Kingdom . |
| 1106603 | 3/1968 | United Kingdom . |
| 1205136 | 9/1970 | United Kingdom . |
| 1218521 | 1/1971 | United Kingdom . |
| 1229231 | 4/1971 | United Kingdom . |
| 1315822 | 5/1973 | United Kingdom . |
| 1436160 | 5/1976 | United Kingdom . |
| 1535891 | 12/1978 | United Kingdom . |
| 2186817 | 8/1987 | United Kingdom . |

OTHER PUBLICATIONS

Chemical Abstracts, vol. 88, No. 6 (1978), 88:39555B, Demjen, Z., et al.

Chemical Abstracts, vol. 82, No. 20(1975), 127179P, Kusakabe, T., et al.

*Primary Examiner*—Howard J. Locker
*Attorney, Agent, or Firm*—Spencer & Frank

[57] ABSTRACT

A fire control composition in particulate form and containing no water, which is particularly effective for fighting metal fires, i.e., Class D fires, and which comprises particles of crushed glass bearing a hydrophobic coating thereon so that agglomeration of the fire control composition due to adsorption of moisture during storage and use is substantially prevented and so that when applied to fire, the fire control composition forms a blanket over the fire which deprives the fire of oxygen and thereby smothers it. The composition additionally contains one or more particulate adjuvants selected from salts and/or spherulized vitreous beads, which adjuvants also bear a hydrophobic coating. Useful adjuvants include graphite particles and salts. The median grain size of the crushed glass is below 200 micrometers, preferably below 120 micrometers, for example, in the range of from 25 to 35 micrometers.

26 Claims, No Drawings

FIRE CONTROL COMPOSITION

BACKGROUND OF THE ART

1. Field of the Invention

This invention relates to the control of fire hazards, and it is concerned with providing materials which may be used in the control of fire hazards, for example in the extinguishing of fires, and methods of controlling fire hazards.

2. Description of the Related Art.

The invention was made in connexion with research into the control of so-called "Class D" fires, and with the control of fire hazards due for example to the escape of molten metal from a containment vessel. Class D fires include those due to burning metals.

Any burning material can of course be the cause of a secondary fire, but the risks of a secondary fire are particularly acute in the case of burning of molten metals because of the high temperatures associated with those materials and the difficulties of extinguishing burning metal and/or reducing the temperature at the site of the fire hazard.

Early efforts to control Class D fires arose as a result of the use of magnesium incendiary devices during the Second World War, and research has continued because of the increasing industrial use of inflammable metals such as magnesium, aluminium, zirconium and titanium. In parallel, fire risks arise in the nuclear industry where use is made of uranium, thorium and plutonium all of which are combustible, and in nuclear reactors and other plants where use is made of a fluid metal heat exchange system containing for example sodium or an alloy of sodium and potassium. Sodium and sodium-potassium fires are recognised as being particularly difficult to control, and their combustion products are quite noxious.

Among materials which were used at an early stage for the control of Class D fires were sand and natural silicates. But these materials, particularly in their less pure form, are not very effective against metal fires, especially alkali metal fires. Also they usually tend to be hygroscopic, and this can lead to caking and can make proper application to the fire hazard difficult.

The use of carbon has been proposed. Recent studies have indicated that a suitable extinguishant for alkali metal fires is expanded graphite or graphite microspheres, but these are very expensive materials. Furthermore, the use of carbon generally is really a counsel of desperation: in effect, the idea is to burn the carbon in order to deprive the alkali metal of oxygen. This does little to reduce the possibility of starting a secondary fire. Other powder extinguishants for alkali metal fires which have been found effective include metal salts, for example a mixture of NaCl 20%, KCl 29% and $BaCl_2$51% by weight. These materials are rather expensive, but their use can be justified against alkali metal fires which cannot easily be controlled in any other way. However, their use for fighting alkaline earth metal fires is less easy to justify, although they may be quite effective for this purpose. For use in fighting alkaline earth metal fires, for example for fighting magnesium fires, it has been proposed to use potassium or ammonium salts, for example potassium chloride (KCl) and acid ammonium phosphate ($NH_4PO_4H_2$). It has also been proposed, for example for the control of zirconium fires, to use a dry powder comprising ground unexpanded or partially expanded perlite because that material contains about 4% to 6% combined water which is released as steam on heating and acts as a foaming agent so that the perlite can form a foam barrier over the burning metal. However, it is not desirable to use materials which release water for controlling alkali metal fires.

SUMMARY OF THE INVENTION

It is an object of this invention to provide an effective and inexpensive material for fighting fires, and in particular such a material which is useful for fighting Class D fires, and which is readily adaptable to be effective against a broad range of burning metals.

According to the invention, there is provided fire hazard control material wholly or mainly consisting of vitreous particles, characterised in that such vitreous particles comprise particles of crushed vitreous material which bear a hydrophobic coating.

DESCRIPTION OF THE PREFERRED EMBODIMENTS

We have found that such a material can be particularly efficacious for use in fighting Class D and other fire hazards and that it can be effective against a broad range of burning materials. The use of particles of crushed vitreous material which bear a hydrophobic coating militates against the adsorption of atmospheric water by the vitreous particles, so promoting flowability and the particles can thus be used easily in known appliances such as dry powder fire extinguishers and even sprinkler systems.

In fact, the fire hazard control material thus provided can be used against almost any type of fire hazard. People who have not been trained in fire-fighting will often, when faced with a fire, take the nearest fire-fighting appliance and use it to attempt to control the fire without thinking of the effect of using that particular type of appliance against that particular type of fire. The dangers of using a water-based extinguishant on an alkali metal fire are well documented, but may often be forgotten in the stress of the moment. The use of non-foamed water-based extinguishants also tends to spread hydrocarbon fires, for example due to burning fuel oil, thus increasing the fire risk. The fire hazard control material of the invention may be used, at least in the first instance, for the control of hydrocarbon and wood or paper fires as well as metal fires. It may be that one particular formulation will not be the optimum for fighting all those classes of fire, but it will have some useful result and it will not add to the danger.

The optimum choice of material generally depends on the nature of the fire risk. Nevertheless, it is usually possible to formulate such a fire hazard control material which will be particularly effective for controlling all the Class D fire hazards which are likely to be encountered at any given site. At the temperatures usually encountered with alkaline earth metal fires, the vitreous particles soften or melt and fuse together to form, if a sufficient quantity is applied, a vitreous blanket which deprives the fire of oxygen and thus smothers it. Though somewhat lower temperatures are usually encountered in the case of alkali metal fires, the temperatures due to burning alkali metals are often sufficiently high at least to soften the vitreous material, and again a smothering blanket of vitreous material can be formed. This alleviates the immediate fire hazard and contains any noxious products which have not already escaped.

The material can be left to cool and the site may be cleared up when it has reached a less uncomfortable temperature for the fire-fighters. The use of such a fire hazard control material also has the advantage of low relative cost as compared with the use of expanded graphite and many other powder extinguishants currently used. A further advantage is that vitreous particles are not themselves corrosive as are many of the metal salts and salt mixtures used for fighting Class D fires.

Another advantage accrues if there is any risk that the site of a Class D fire will be exposed to water. Such a risk is quite common, because the heat generated in a metal fire will tend to ignite any combustible material in the vicinity and so start a secondary fire; such a secondary fire will often be treated with a water-based extinguishant. We have noted that powders currently used for controlling Class D fires tend to be washed away from the metal by water, so allowing contact between the water and the metal. This is not of any great significance in the case of some metals, provided that they have had an opportunity to cool sufficiently, but it will almost inevitably lead to the re-ignition of an alkali metal fire. This danger is avoided by the formation of a continuous water-proof blanket of vitreous material over the metal at risk.

There is also a further fire hazard which may be encountered in industrial practice, and this is as follows. In metallurgical and other industries, it sometimes happens that a vessel containing molten metal springs a leak, with the result that a stream of molten metal pours down from it. The actual nature of the resulting fire hazard of course depends on the nature and the temperature of the molten metal. By way of example, some sodium-potassium alloys are molten at ordinary room temperatures, but they react quite vigorously with concrete and will ignite spontaneously. Quite apart from any tendency of the metal itself to burn, less active metals, for example copper or steel, melt at high temperatures, and by virtue of the temperature, they will in general tend to ignite any combustible material with which they come into contact. A pool of molten metal spreading over the floor in an uncontrolled way will also disallow close approach to the leak by emergency personnel, and it will be extremely difficult to clear up after it has cooled and solidified.

In order to alleviate this type of fire hazard, the control material provided by the present invention can be projected in suitable manner to form a dam on the surface against which the molten metal drops. Depending on the severity of the leak, it may be possible to contain the molten metal, or it may be possible merely to control its direction of flow, for example towards a location at which it will do the least perceivable damage. Even in the case of an extremely severe leakage of metal which is hot enough to melt the vitreous material, the particles will tend to form a molten border to the escaped molten metal which is of very much higher viscosity than the molten metal itself and thus the flow of the metal will be impeded in one or more selected directions so that it can be guided to a desired location. This allows increased time for other steps to be taken and for the escape of non-essential personnel. Furthermore, the glass will absorb radiation from the molten metal, so making it easier for emergency personnel to approach more closely.

In some embodiments of the invention, such fire hazard control material contains particles of at least one adjuvant which bear a hydrophobic coating. Such adjuvants may be selected as to composition and/or as to relative quantity for conferring properties on the material which make it particularly suitable for fighting various types of fire hazard, thus rendering the material the subject of the invention more versatile in it use.

In some preferred embodiments of the invention, such adjuvant comprises at least one salt. The use of such a salt adjuvant appears to increase the efficacity of the material in controlling fire hazards, and in some applications does this to such an extent as to compensate for the increased cost of the material due to the presence of the salt, and for any tendency of the salt to cause corrosion.

Advantageously, the surfaces of the salt particles are coated with a stearate or a silicone. Stearates and silicones form effective hydrophobic coatings on particles of salts.

Among salts which have been found particularly efficacious are salts selected from: alkali metal salts, ammonium salts, and alkaline earth metal salts, and their use is accordingly preferred. For similar reasons it is preferred to use a salt selected from: chlorides, carbonates, bicarbonates and phosphates. A possible reason for the efficacity of such salts is that they tend to melt at lower temperatures than most vitreous materials, with the result that on the application of the material to the site of a fire hazard, the salt can melt so that it flows easily into the interstices between the particles of crushed vitreous material, so forming an impervious barrier more rapidly.

When a salt adjuvant is used in conjunction with the crushed vitreous material, some preferred embodiments of the invention provide that such adjuvant further comprises particles of graphite. Although graphite is expensive, and though it may not be very efficacious for preventing secondary fires, it can be of benefit as an adjuvant in the circumstances of certain Class D fires.

As an alternative, or in addition to the use of a salt adjuvant, some preferred embodiments of the invention provide that such adjuvant comprises particles of spherulized vitreous material. The use of such a spherulized vitreous adjuvant also increases the efficacity of the material in controlling fire hazards. The use of a mixture of crushed vitreous particles and vitreous beads is particularly effective because the rounded beads promote good flow properties of the mixture while the sharp edges of the crushed particles become softened rapidly on exposure to sufficient heat so that a vitreous blanket can be formed quickly. Preferably, such spherulized vitreous material substantially consists of solid vitreous beads.

The granulometry of the spherulized vitreous beads can have an important effect on the efficacity of a fire hazard control material in which they are incorporated. Advantageously, at least 50% by number of the spherulized vitreous particles present have a grain size below 50 $\mu$m, and preferably below 30 $\mu$m. A possible explanation of the increased efficacity of such small spherulized vitreous particles is that they are easily fusible to fill the interstices between crushed glass particles so promoting the formation of an impervious barrier over the site of a fire hazard. The use of such small spherulized vitreous particles as adjuvant instead of a salt-type adjuvant has the additional advantage that there is no tendency for the resulting vitreous mass to dissolve in any water applied to fight a secondary fire at the same hazard site.

The total proportion of said adjuvant in a fire hazard control material according to the invention also has a bearing on the efficacity and cost of that material. Rather surprisingly, optimum proportions of total adjuvant seem to be independent of whether the adjuvant is a salt or spherulized vitreous particles, or a mixture of such substances.

In preferred embodiments, fire hazard control material according to the invention contains one or more of said adjuvants in a total adjuvant proportion not exceeding 80% by mass of the crushed vitreous particles. This upper limit on the amount of adjuvant helps to keep costs down while enabling sufficient adjuvant to be used for good results.

In some preferred embodiments of the invention, such material contains one or more of said adjuvants in a total adjuvant proportion of between 50% and 80% by mass of the crushed vitreous particles. Fire hazard control materials having this preferred feature of the invention are particularly efficacious when used against hydrocarbon fires.

In other preferred embodiments of the invention, such material contains one or more of said adjuvants in a total adjuvant proportion of between 5% and 50% by mass of the crushed vitreous particles. Fire hazard control materials having this preferred feature of the invention are particularly efficacious when used against Class D fires.

In any event, we have found that the use of large proportions of adjuvant is disproportionately expensive in relation to the benefits gained, and it is accordingly preferred that said crushed vitreous particles constitute at least 65% by mass of the fire hazard control material. Advantageously, said crushed vitreous particles constitute at least 75% by mass and optimally at least 90% by mass of the fire hazard control material.

We have also found that the size of the vitreous particles is important for their efficacy as fire hazard control materials in accordance with the invention. We initially thought that it would be necessary to use vitreous particles having a median grain size (by count rather than by mass) somewhat in excess of 300 μm so that the particles would have sufficient mass that they could easily be projected through the highly turbulent gas above a Class D fire and come to rest on the surface of the metal without being blown away. We were surprised to note that this is not the case, and that efficacy is much promoted if, as is preferred, at least 50% by number of the crushed vitreous particles have a grain size below 200 μm. We have found that this has an additional advantage in that it promotes flowability of the particles, and it also has a beneficial effect on the way they behave at the site of a fire. We have also found that such small particles do not necessarily sink even in molten sodium and sodium-potassium alloys, when the vitreous particles may be denser than the molten metal, provided that a sufficient quantity is applied for rapid extinction of the fire. It is not completely clear why this should be so. It may be that the particles are held up by surface tension effects, or it may be due to some other reason. If the particles do sink, extinction may be obtained by a further application of the fire hazard control material. A further advantage of using such small particles is that they are more easily sintered together to form a continuous blanket over the burning metal, so leading to a more rapid and effective smothering of the fire.

We have found that these advantages are promoted when at least 50% by mass of the crushed vitreous particles present have a grain size below 120 μm, as is preferred. Indeed, in may of the most preferred embodiments of the invention, the median grain size of the crushed vitreous particles is below 60 μm, for example in the range 25 to 35 μm.

The vitreous particles of the material of the invention, whether they be the crushed particles or the optional spherulized adjuvant, bear a hydrophobic coating to militate against the adsorption of atmospheric moisture by the vitreous particles and thus promote flowability. Various hydrophobic substances may be used, but among the most efficacious are organo-silanes, and silicones. Silicone DC 1107 from Dow Corning is a very suitable silicone. Such substances can form strongly adherent coatings on vitreous material so prolonging the time for which they are effective, and it is accordingly preferred that the surfaces of the vitreous particles include silicone and/or organo-silane groups. Fluorocarbons may also be used as hydrophobic substance.

In order further to promote flowability of the fire hazard control material, it is preferred that the vitreous particles are coated or mixed with an anti-caking agent. This promotes flow through a nozzle of a fire extinguisher, and also has a beneficial effect on the way in which the fire hazard control material distributes itself at the site of the fire hazard.

In some preferred embodiments of the invention, the anti-caking agent comprises a finely divided substance which is hydrophobic, inorganic and substantially chemically inert with respect to such vitreous particles and has a specific surface of at least 50 $m^2/g$. As a consequence of its effect in promoting flow of the vitreous particles, the addition of such a finely divided substance also tends to give rise to an increase in the bulk settled density of the fire hazard control material, thus allowing a greater quantity of that fire hazard control material to be contained in a fire extinguisher of a given size.

The efficacy of said finely divided substance is promoted when it has a specific surface of at least 100 $m^2/g$ as is preferred.

Various finely divided substances may be used, but it is especially preferred that such finely divided substance substantially entirely consists of silica.

Finely divided silica having the required properties is commercially available from Degussa (Frankfurt) under their Trade Mark AEROSIL and from Cabot Corporation (Tuscola, Ill.) under their Trade Mark CAB-O-SIL. A finely divided silica derived from diatomaceous earth and available under the Trade Mark CELLITE may also be used.

Said finely divided substance is preferably present in said composition in an amount of at least 0.02% by weight of the crushed vitreous particles. It is in general not necessary to use more than 0.5% finely divided substance by weight of such vitreous particles, and for economy it is preferred that said finely divided substance be present in an amount not more than 0.2% by weight of the crushed vitreous particles.

In some preferred embodiments of the invention, said vitreous particles comprise particles of a vitreous material having a flow point below 600° C. The flow point of a vitreous material is defined as the temperature at which the vitreous material has a viscosity of 10 kPas ($10^5$ poise). Such vitreous particles readily coalesce to form a substantially impermeable blanket over a mass of burning metal. It is to be noted that many such vitreous materials are rich in alkali metal ions. As a result, they are very sensitive to humidity and it is especially advantageous that particles of such materials should be treated with a hydrophobic substance as required.

Alternatively, or in addition, it is preferred that said vitreous particles comprise particles of a vitreous material having a high content of lead. Many high-lead vitreous materials have a relatively low flow point, and they may have rather a low content of alkali metal ions so that they are relatively insensitive to humidity. The use of a high-lead vitreous material is also advantageous where there is any risk that the burning metal may exhibit radioactivity. For example burning metal coolant from a nuclear reactor may not in fact be significantly contaminated by radioactive material, but it is sensible to take the precaution of using a high-lead extinguishant to provide some measure of screening against nuclear radiation. Many suitable compositions of high-lead vitreous material are known per se as vitreous enamels.

Yet other preferred embodiments of the invention provide that said particles comprise particles of a vitreous material having a high coefficient of absorption of infra-red radiation. It is well known that the presence of iron oxide in vitreous material promotes absorption of infra-red radiation, particularly when the vitreous material is formed under reducing conditions. The use of such vitreous material allows closer approach by emergency personnel after an initial layer thereof has been applied to a Class D fire or to control the flow of hot molten metal.

The use of particles of vitreous material having different compositions can also have advantages in some circumstances. Considering for example the case of a sodium fire, a vitreous material having a low flow point may quite rapidly form a molten layer on top of the metal, so tending to smother the fire. But if the molten vitreous material has a higher density than molten sodium, parts of that layer are likely to sink, and they may expose fresh sodium surface which can then re-ignite. If particles of a vitreous material having a higher flow point are used in combination with the more easily fusible vitreous material however, those particles may not melt. Those particles, provided that they do not have too great a density, together with any gas trapped between them, can form an isolating barrier which rests on the surface of the metal and which is of reduced temperature, and thus more viscous, because of the absorption of heat from the metal as latent heat of melting of the particles of the more easily fusible glass. This can provide more rapid control of the fire with the use of a smaller quantity of extinguishant than would be possible by using either vitreous material alone.

The invention includes fire hazard control equipment containing fire hazard control material as defined herein.

Such equipment can be very effective for use against Class D fires and other fires. The equipment may for example take the form of a dry powder fire extinguisher. Powder fire extinguishers are well known per se, and it is not necessary to give a detailed description of their construction or operation. Such an extinguisher may generally be charged with carbon dioxide or nitrogen. It is known however that in some circumstances, carbon dioxide can be caused to dissociate and that nitrogen can give rise to the formation of ammonia, both of which phenomena may be undesirable. Accordingly, if the increased cost can be justified because of such risks or otherwise, helium or argon may be used to charge the extinguisher. It is especially desirable that such an extinguisher should be equipped with a tapering mouthpiece to allow expansion of the charging gas after leaving the container so that the gas current is slowed down. This allows the composition to be directed to the site of a fire without risk that too many vitreous particles already there will be blown away. It also reduces the risk that a strong current of air will be entrained with the extinguisher charging gas and so perhaps encourage the fire to burn more fiercely.

The invention also includes a method of controlling a fire hazard, which method comprises applying to the site of the fire hazard a fire hazard control material wholly or mainly consisting of vitreous particles, characterised in that such vitreous particles comprise particles of crushed vitreous material which bear a hydrophobic coating. This is a very effective method of fighting a fire hazard, and is particularly appropriate for the control of a Class D fire hazard. Such method preferably comprises applying to the site of the fire hazard a fire hazard control material as defined herein.

For the most effective control of a fire hazard, it is preferred that the fire hazard control material is applied to form an impermeable blanket over the site of the fire hazard.

Various preferred embodiments of the invention will now be described by way of Example only.

EXAMPLES

Solid vitreous particles were manufactured by crushing glass cullet. The cullet was crushed to give vitreous particles having a median grain size ($G_{50}$) between 25 and 35 $\mu$m.

The vitreous particles were rendered hydrophobic by coating them with silicone DC 1107 from Dow Corning.

In a variant, the vitreous particles were coated with another hydrophobic agent, fluorocarbon FC 129 (from 3M), in an amount of 0.5 g per kilogram of vitreous particles.

In a second variant, the vitreous particles were intimately mixed with 0.4% by weight of a finely divided anti-caking agent which was a hydrophobic silica having a specific surface of 120 $m^2/g$ commercially available as AEROSIL (Trade Mark) R 972.

In a third variant, the vitreous particles were intimately mixed with finely divided hydrophobic silica commercially available as CAB-O-SIL (Trade Mark) N70-TS in an amount of 0.15% by weight of the beads. The silica had a specific surface of 70 $m^2/g$.

In a fourth variant, the vitreous particles were intimately mixed with 0.2% by weight of finely divided silica commercially available as CELLITE (Trade Mark).

In further variants, the vitreous particles were first mixed with one or other of the finely divided silicas referred to and then coated with silicone. It was found that this resulted in a more uniform coating on the vitreous particles than coating before mixing with the finely divided silica.

Various tests have been made in order to assess the efficacy of the extinguishants proposed according to this invention.

EXAMPLE 1

One series of tests was performed on magnesium fires. A draft International Standard (ISO/TC 21/SC2) dated 5th Mar. 1987 proposes for this purpose placing 40 pounds (18.12 kg) of cut magnesium ribbon in a steel pan 2 feet square (610×610 mm) and 4½ inches (115 mm) deep. The metal is ignited with an oxy-acetylene gas torch, and attempts are made to extinguish the fire when flame covers half the exposed surface of the magnesium.

In a first test comparison, a dry powder extinguisher of known type was charged with 9 kg of crushed glass particles having the following granulometry: lower decile grain size ($G_{10}$) 6.5 μm, median grain size ($G_{50}$) 26 μm, and upper decile grain size ($G_{90}$) 81.6 μm.

The lower decile grain size is the size selected so that 10% by number of the particles have a lower grain size, and 90% by number a higher grain size. The upper decile grain size is the size selected so that 90% by number of the particles have a lower grain size, and 10% by number a higher grain size. The median grain size is the size selected so that 50% by number of the particles have a lower grain size, and 50% by number a higher grain size.

The following anti-caking agents were used: AEROSIL (Trade Mark) R 972 finely divided silica, and silicone DC 1107 hydrophobic coating material. The extinguisher was pressurized using a carbon dioxide bulb. The construction of the extinguisher nozzle was such as to deliver the crushed vitreous particles in a gas stream which had sufficiently low velocity not to cause spreading of the fire. Such constructions are well known per se for classical dry powder extinguishers. The extinguisher used was type GIP10ABC from Sicli. It was found that complete extinction of the fire could be achieved with that single extinguisher. After the test pan had been allowed to cool for 24 hours, 5.82 kg of glass powder could be blown away from the surface of the mass, and the recoverable metallic magnesium remaining weighed about 15 kg. For comparison, two extinguishers of similar type were each charged with a powder currently marketed for extinguishing Class D fires under the Trade Name Sicli HPJ10. Though there was apparent extinction of the fire, in that no flames were visible, it was found that the temperature of the test pan continued to rise. There was no unburnt magnesium after 24 hours.

EXAMPLE 2

When fire was set to the same weight of magnesium occupying the same area but located on a plate without side walls, it was possible to achieve apparent extinction of the fire for about 30 minutes using the 9 kg glass particle extinguisher, but the fire then re-ignited. This does however give time for other steps to be taken during the time when the fire is quiescent. This test was repeated, and it was possible to achieve a complete extinction of the fire using two extinguishers each charged with 9 kg of powder according to this invention. The powder used was the same as that described above except that 10% by weight of the crushed glass particles were replaced by silicone-coated glass beads having the following granulometry characteristics: lower decile grain size ($G_{10}$) 25 μm, median grain size ($G_{50}$) 65 μm, and upper decile grain size ($G_{90}$) 125 μm. After cooling of the site of the fire, 14 kg of the powder extinguishant could be blown away from the site of the fire, and the amount of recoverable metallic magnesium remaining was 13.6 kg.

EXAMPLE 3

In a second test comparison, two batches of 18 kg of magnesium were each mixed with 1.8 kg of liquid. The liquid was 95% water and 5% of a cutting oil sold under the Trade Name JIDAC 20 Z. Three dry powder extinguishers of known type were charged, two with 6 kg of crushed glass particles and one with 9 kg of crushed glass particles. The glass particles used had the same granulometry as in the first test comparison, and the same anti-caking agents were used. The extinguishers were pressurized using carbon dioxide. Complete extinction of the fire could be achieved with two extinguishers, but after several minutes a chimney appeared in the blanket of vitreous material which covered the test pan, and more and more water vapour started to escape. The fire re-ignited after 23 minutes, and the third extinguisher was used to put out the fire rapidly and successfully. After the test pan had been allowed to cool for 24 hours, 11.77 kg of glass powder could be blown away from the mass, and the recoverable unburnt magnesium remaining weighed about 10 kg.

For comparison, two extinguishers of similar type were each charged with 6 kg of Sicli's HPJ10 powder, and a third extinguisher was charged with 9 kg of that powder. Partial extinction took place with two extinguishers, but a large crack immediately appeared in the mass of powder over the test pan, and it was necessary to apply the third extinguisher. After the test pan had been allowed to cool for 24 hours, 4.12 kg of powder could be blown away from the mass, and the recoverable magnesium weighed about 5 kg.

EXAMPLE 4

40 pounds (18.12 kg) of very fine aluminium powder having an average grain size below 20 μm and a specific surface of about 3000 $cm^2/g$ was ignited under the ISO test conditions set forth. The extinguishant used was based on crushed glass cullet graded to have the following granulometry: lower decile grain size ($G_{10}$) 6.5 μm, median grain size ($G_{50}$) 26 μm, and upper decile grain size ($G_{90}$) 81.6 μm. The vitreous particles were rendered hydrophobic by coating them with silicone DC 1107 from Dow Corning, and they were mixed with 0.4% by weight of AEROSIL (Trade Mark) R 972 finely divided hydrophobic silica anti-caking agent and 5% by weight of potassium chloride coated with stearate. The fire was extinguished using two extinguishers each containing 9 kg of the powder. 2 kg of powder remained unused in the second extinguisher. After the site had cooled, it was found that about 14 kg of aluminium powder remained unburnt.

EXAMPLE 5

Particles of crushed vitreous material were used to dam the flow of molten steel which had been released from a containment vessel. The glass used was a soda-lime glass containing by weight, about 0.6% $Fe_2O_3$, 0.15% $SO_3$, 0.04% $TiO_2$ and 0 to 3 parts per million cobalt, in a redox state "bivalent iron as a proportion of total iron" of about 25%. In a sheet thickness of 4 mm, this glass has an infra-red energy transmissivity of about 50%. The glass particles had a hydrophobic silicone coating, and a median grain size below 120 μm.

EXAMPLE 6

20 liters of heavy fuel oil was ignited, and was then extinguished using an extinguisher containing 6 kg of powder. The powder used comprised by weight, 59.6% silicone-coated crushed glass cullet with the following granulometry: lower decile grain size ($G_{10}$) 6.5 μm, median grain size ($G_{50}$) 26 μm, and upper decile grain size ($G_{90}$) 81.6 μm, 20% stearate-coated sodium bicarbonate, 20% stearate-coated potassium chloride, and 0.4% AEROSIL (Trade Mark). A similar result was achieved in extinguishing a fire of 20 liters of methanol.

EXAMPLE 7

35 pounds (15.9 kg) of sodium was ignited under the draft ISO conditions. Complete extinction of the fire was achieved using about 15 kg of powder. The powder used was as specified in Example 6 save that the sodium bicarbonate and potassium chloride contents were each reduced to 15%, the crushed glass cullet being increased to 69.6% of the powder. In a variant, the sodium bicarbonate and potassium chloride were replaced by an equivalent quantity of stearate-coated sodium chloride.

An especially useful composition for glass particles for use in controlling fire hazard (burning and flow) of molten sodium which has been slightly contaminated with radioactive elements is the following: 72% PbO, 14% $SiO_2$, 14% $B_2O_3$. This glass has a softening point of 477° C. The softening point of a vitreous material is defined as the temperature at which that material has a viscosity of $10^{7.65}$ poise.

EXAMPLE 8

In another test, 1.77 kg of sodium was ignited. An argon charged extinguisher containing 9 kg of powder was used to extinguish the fire. The powder comprised 70% by weight of the crushed glass cullet specified in Example 6, 22.5% stearate-coated sodium carbonate, and 7.5% graphite. This powder gave a rapid diminution of the gaseous phase of the fire followed by a stable extinction. In fact only about 4 kg of the powder was needed for complete extinction, and it would be possible to achieve the same result using even less powder if the extinguisher was equipped with a suitable pressure-reducing nozzle.

In a variant, the sodium carbonate was replaced by stearate-coated potassium chloride. The proportions by weight of the constituents of the powder were: 70% cullet, 25% KCl and 5% graphite.

The following table gives an indication of the facility with which various constituents of powders and powders according to the invention can be projected, and their relative efficacity in extinguishing fires of aluminium or magnesium on the one hand, and of sodium on the other hand. The criterion used to judge the efficacity of the powders was the amount of recoverable metal left at the site of the fire after cooling. Similar quantities of materials were used for the various aluminium and magnesium tests and for the various sodium tests.

TABLE 1

| Powder | Projectibility | Efficacity Al/Mg | Na |
|---|---|---|---|
| Crushed glass (G) | poor | fair | fair |
| Large beads (AH) | good | very poor | very poor |
| Small beads (AQ) | very good | very poor | very poor |
| KCl | excellent | fair | good |
| G + KCl | very good | very good | excellent |
| G + AH | fair | excellent | fair |
| G + AQ | good | excellent | fair |
| G + AQ + KCl | very good | very good | good |
| G + KCl + graphite | excellent | very good | excellent |

The crushed glass G had the granulometry specified in Examples 4 and 6, and were coated with silicone.

The glass beads were also coated with silicone. The large beads AH had a median grain size of 65 μm, and the small beads AQ had the following granulometry: lower decile grain size ($G_{10}$) 11 μm, median grain size ($G_{50}$) 26 μm, and upper decile grain size ($G_{90}$) 58 μm.

The potassium chloride KCl was coated with stearate.

In all cases a small quantity of AEROSIL (Trade Mark) was mixed into the powder.

The results for the powder "G+KCl" are applicable to powders containing between 60 and 80% by weight crushed glass particles and between 40 and 20% potassium chloride.

The results for the powders "G+AH" and "G+AQ" are applicable to powders containing between 90 and 95% by weight crushed glass particles and between 10 and 5% glass beads.

The results for the powder "G+AQ+KCl" are applicable to powders containing between 80 and 90% by weight crushed glass particles, between 10 and 5% potassium chloride and between 10 and 5% small glass beads.

The results for the powder "G+KCl+graphite" are applicable to powders containing between 53 and 70% by weight crushed glass particles, between 25 and 35% potassium chloride and between 12 and 5% graphite.

We claim:

1. A fire control composition which is in particulate form and which is anhydrous, the fire control composition comprising:

as the main ingredient, particles of crushed glass bearing a hydrophobic coating thereon, so that agglomeration of the fire control composition due to adsorption of moisture during storage and use is substantially prevented, and being characterized in that at least 50% by number of the particles of crushed glass have a grain size below 200 μm, so that, when the fire control composition is exposed to fire, the fire control composition forms a blanket over the fire which deprives the fire of oxygen and thereby smothers it; and particles of at least one additional material bearing a hydrophobic coating and comprising spherulized vitreous material.

2. The fire control composition according to claim 1, wherein the particles of at least one additional material further comprises at least one salt.

3. The fire control composition according to claim 2, wherein the surfaces of the particles of the at least one salt are coated with one of a stearate and a silicone.

4. The fire control composition according to claim 2, wherein the at least one salt is selected from the group consisting of alkali metal salts, ammonium salts, and alkaline earth metal salts.

5. The fire control composition according to claim 2, wherein the at least one salt is selected from the group consisting of chlorides, carbonates, bicarbonates and phosphates.

6. The fire control composition according to claim 2, wherein the particles of at least one additional material further comprise particles of graphite.

7. The fire control composition according to claim 1, wherein the spherulized vitreous material consists essentially of solid vitreous beads.

8. The fire control composition according to claim 1, wherein at least 50% by number of the spherulized vitreous particles have a grain size below 50 μm.

9. The fire control composition according to claim 8, wherein at least 50% by number of the spherulized vitreous particles have a grain size below 30 μm.

10. The fire control composition according to claim 1, wherein the particles of crushed glass constitute at least 65% by mass of the fire control composition.

11. The fire control composition according to claim 10, wherein the particles of crushed glass constitute at least 75% by mass of the fire control composition.

12. The fire control composition according to claim 11, wherein the particles of crushed glass constitute at least 90% by mass of the fire control composition.

13. The fire control composition according to claim 1, wherein at least 50% by number of the particles of crushed glass have a grain size below 120 μm.

14. The fire control composition according to claim 1, wherein the hydrophobic coating comprises at least one material selected from the group consisting of a silicone and an organo-silane.

15. The fire control composition according to claim 1, wherein the particles of crushed glass are mixed with an anti-caking agent.

16. The fire control composition according to claim 15, wherein the anti-caking agent comprises a finely divided substance which is hydrophobic, inorganic, and substantially chemically inert with respect to the particles of crushed glass, and has a specific surface of at least 50 $m^2/g$.

17. The fire control composition according to claim 16, wherein the finely divided substance has a specific surface of at least 100 $m^2/g$.

18. The fire control composition according to claim 15, wherein the anti-caking agent substance consists essentially of finely divided silica.

19. The fire control composition according to claim 16, wherein the finely divided substance is present in an amount of at least 0.02% by mass of the particles of crushed glass.

20. The fire control composition according to claim 1, wherein the particles of crushed glass have a flow point temperature below 600° C.

21. The fire control composition according to claim 1, wherein the particles of crushed glass have a high content of lead.

22. The fire control composition according to claim 1, wherein the particles of crushed glass have a high coefficient of absorption of infra-red radiation.

23. The fire control composition according to claim 1, wherein the fire control composition is a metal fire control composition.

24. Fire control equipment containing a fire control composition which is in particulate form and which is anhydrous, the fire control composition comprising:

as the main ingredient, particles of crushed glass bearing a hydrophobic coating thereon, so that agglomeration of the fire control composition due to adsorption of moisture during storage and use is substantially prevented, and being characterized in that at least 50% by number of the particles of crushed glass have a grain size below 200 μm, so that, when the fire control composition is exposed to fire, the fire control composition forms a blanket over the fire which deprives the fire of oxygen and thereby smothers it; and particles of at least one additional material bearing a hydrophobic coating and comprising spherulized vitreous material.

25. The process of controlling a fire, comprising:

applying to the site of a fire a fire control composition which is in particulate form and which is anhydrous, the fire control composition comprising:

as the main ingredient, particles of crushed glass bearing a hydrophobic coating thereon, so that agglomeration of the fire control composition due to adsorption of moisture during storage and use is substantially prevented, and being characterized in that at least 50% by number of the particles of crushed glass have a grain size below 200 μm, so that, when the fire control composition is exposed to fire, the fire control composition forms a blanket over the fire which deprives the fire of oxygen and thereby smothers it; and particles of at least one additional material bearing a hydrophobic coating and comprising spherulized vitreous material.

26. The process according to claim 25, wherein the fire control composition is applied to form an impermeable blanket over the site of the fire.

* * * * *